US010921526B2

(12) United States Patent
Bian et al.

(10) Patent No.: US 10,921,526 B2
(45) Date of Patent: Feb. 16, 2021

(54) GRATING COUPLERS WITH A SILICIDE MIRROR

(71) Applicant: GLOBALFOUNDRIES Inc., Grand Cayman (KY)

(72) Inventors: Yusheng Bian, Ballston Lake, NY (US); Ajey Poovannummoottil Jacob, Watervliet, NY (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 0 days.

(21) Appl. No.: 16/515,779

(22) Filed: Jul. 18, 2019

(65) Prior Publication Data

US 2021/0018690 A1 Jan. 21, 2021

(51) Int. Cl.
*G02B 6/34* (2006.01)
*G02B 6/12* (2006.01)
*F21V 8/00* (2006.01)

(52) U.S. Cl.
CPC ............. *G02B 6/34* (2013.01); *G02B 6/0016* (2013.01); *G02B 6/12* (2013.01); *G02B 2006/12104* (2013.01)

(58) Field of Classification Search
CPC ............................................ G02B 2006/12104
See application file for complete search history.

(56) References Cited

U.S. PATENT DOCUMENTS 9,411,106 B2 * 8/2016 Doany ..................... G02B 6/34
9,715,064 B1 * 7/2017 Gambino ............... G02B 6/124
10,126,497 B2 * 11/2018 Boeuf .................... G02B 6/126
10,185,092 B1 1/2019 Bian et al.
2010/0119231 A1 * 5/2010 Kim ....................... G02B 6/124 398/82
2011/0122405 A1 * 5/2011 Wu ....................... G01N 21/658 356/301
2013/0216177 A1 * 8/2013 Tseng ..................... G02B 6/132 385/14
2019/0148913 A1 * 5/2019 Lebby ................. H01S 5/18308 372/50.11

OTHER PUBLICATIONS

Ajey P. Jacob et al, “Silicon Nitride Grating Couplers” filed Jan. 23, 2018 as U.S. Appl. No. 15/878,025.

S. K. Selvaraja et al., “Highly efficient grating coupler between optical fiber and silicon photonic circuit,” 2009 Conference on Lasers and Electro-Optics and 2009 Conference on Quantum electronics and Laser Science Conference, Baltimore, MD, 2009, pp. 1-2.

W. S. Zaoui, A. Kunze, W. Vogel and M. Berroth, “CMOS-Compatible Polarization Splitting Grating Couplers With a Backside Metal Mirror,” in IEEE Photonics Technology Letters, vol. 25, No. 14, pp. 1395-1397, Jul. 15, 2013.

(Continued)

*Primary Examiner* — Omar R Rojas

(74) *Attorney, Agent, or Firm* — Thompson Hine LLP; Anthony Canale

(57) ABSTRACT

Structures for a grating coupler and methods of fabricating a structure for a grating coupler. A silicide layer is formed on a patterned section of a semiconductor layer. The grating structures of a grating coupler are formed over the silicide layer and the section of the semiconductor layer.

18 Claims, 5 Drawing Sheets

(56) References Cited

OTHER PUBLICATIONS

Dirk Taillaert, Peter Bienstman, and Roel Baets, "Compact efficient broadband grating coupler for silicon-on-insulator waveguides," Opt. Lett. 29, 2749-2751 (2004).
F. Van Laere, G. Roelkens, J. Schrauwen, D. Taillaert, P. Dumon, W. Bogaerts, D. Van Thourhout, and R. Baets, "Compact Grating Couplers Between Optical Fibers and Silicon-on-Insulator Photonic Wire Waveguides with 69% Coupling Efficiency," in Optical Fiber Communication Conference and Exposition and the National Fiber Optic Engineers Conference, Technical Digest (CD) (Optical Society of America, 2006), paper PDP15.
Wissem Sfar Zaoui, María Félix Rosa, Wolfgang Vogel, Manfred Berroth, Jörg Butschke, and Florian Letzkus, "Cost-effective CMOS-compatible grating couplers with backside metal mirror and 69% coupling efficiency," Opt. Express 20, B238-B243 (2012).
Stijn Scheerlinck, Jonathan Schrauwen, Frederik Van Laere, Dirk Taillaert, Dries Van Thourhout, and Roel Baets, "Efficient, broadband and compact metal grating couplers for silicon-on-insulator waveguides," Opt. Express 15, 9625-9630 (2007).

* cited by examiner

GRATING COUPLERS WITH A SILICIDE MIRROR

BACKGROUND

The present invention relates to photonics chips and, more specifically, to structures for a grating coupler and methods of fabricating a structure for a grating coupler.

Photonics chips are used in many applications and systems including, but not limited to, data communication systems and data computation systems. A photonics chip integrates optical components, such as waveguides and bends, and electronic components, such as field-effect transistors, into a unified platform. Among other factors, layout area, cost, and operational overhead may be reduced by the integration of both types of components.

Grating couplers are commonly used in photonics chips for coupling optical signals between waveguides and optical fibers. Despite their usefulness, grating couplers are plagued by a low coupling efficiency that leads to unacceptably high losses.

Improved structures for a grating coupler and methods of fabricating a structure for a grating coupler are needed.

SUMMARY

In an embodiment of the invention, a structure includes a semiconductor layer having a section, a silicide layer on the section of the semiconductor layer, and a grating coupler having a plurality of grating structures positioned over the silicide layer and the section of the semiconductor layer.

In an embodiment of the invention, a method includes patterning a semiconductor layer to form a section, forming a silicide layer on the section of a semiconductor layer; and forming a grating coupler including a plurality of grating structures positioned over the silicide layer and the section of the semiconductor layer.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
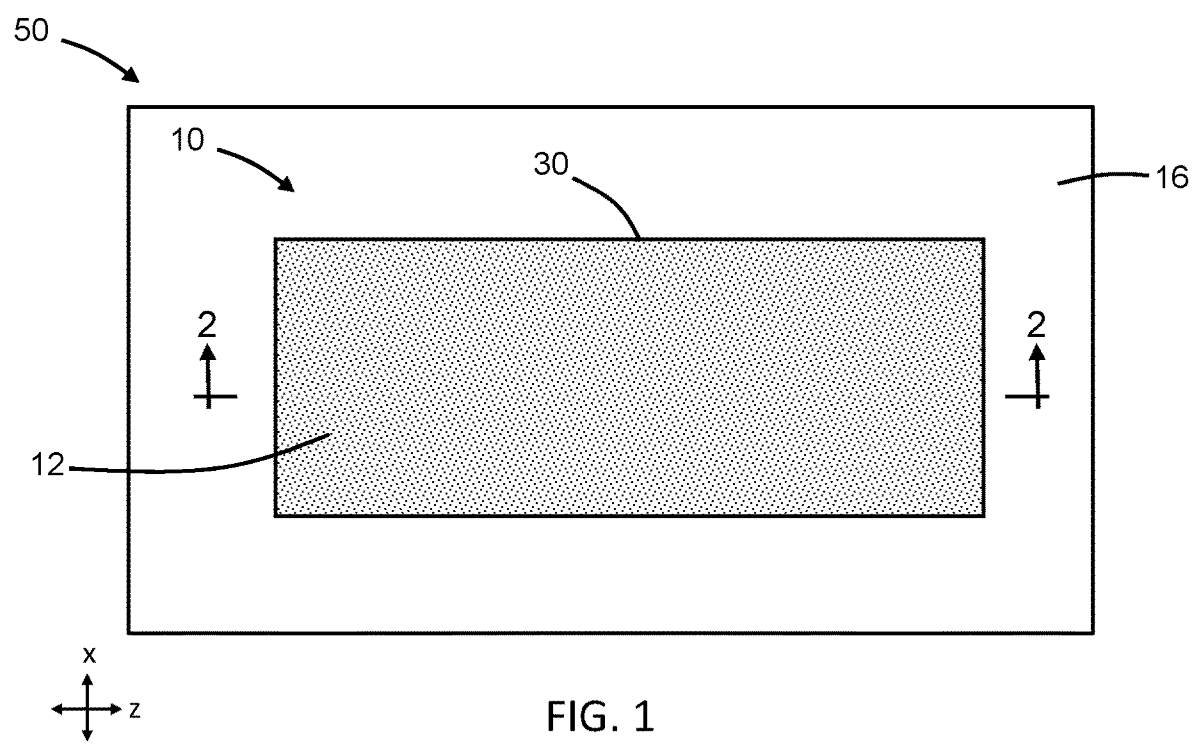
FIG. 1 is a top view of a structure at an initial fabrication stage of a processing method in accordance with embodiments of the invention.
Figure 2:
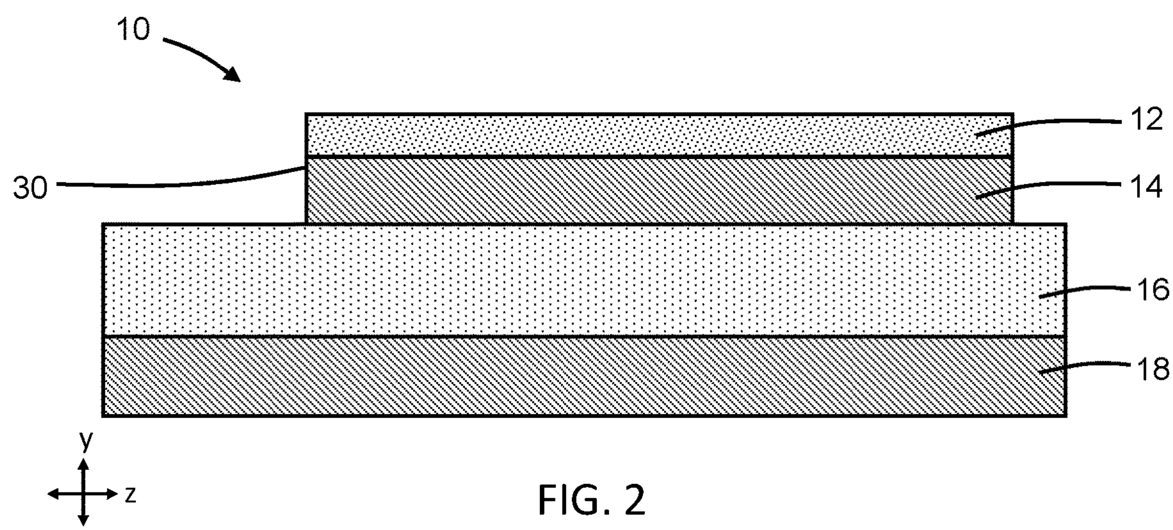
FIG. 2 is a cross-sectional view of the structure taken generally along line 2-2 in FIG. 1.

With reference to FIGS. 1, 2 and in accordance with embodiments of the invention, a structure 10 includes a silicide layer 12 that is positioned on a section of a semiconductor layer 14. The semiconductor layer 14 may be composed of a single-crystal semiconductor material, such as single-crystal silicon and, in particular, single-crystal silicon originating from a device layer of a silicon-on-insulator (SOI) wafer. The silicon-on-insulator wafer further includes a buried insulator layer 16 composed of a dielectric material, such as silicon dioxide, and a substrate 18 composed of a single-crystal semiconductor material, such as single-crystal silicon, under the buried insulator layer. The section of the semiconductor layer 14 may be patterned from the device layer of the SOI wafer by lithography and etching processes during front-end-of-line processing. The section of the semiconductor layer 14 may have a thickness that is equal to or substantially equal to the original thickness of the device layer of the SOI wafer. Alternatively, the section of the semiconductor layer 14 may have etched thickness that is less than the original thickness of the device layer of the SOI wafer.

The silicide layer 12 may be formed by a silicidation process involving the deposition of a layer of a silicide-forming metal by, for example, chemical vapor deposition or physical vapor deposition on the section of the semiconductor layer 14, followed by one or more annealing steps (e.g., rapid thermal annealing). The annealing steps form a silicide phase by causing the layer of silicide-forming metal to react with the contacted semiconductor material of the section of the semiconductor layer 14. Candidate materials for the silicide-forming metal include, but are not limited to, nickel, titanium, cobalt, palladium, platinum, or a combination of these metals, or other metals capable of reacting with silicon to form a low-resistivity, thermally-stable silicide. Residual silicide-forming metal remaining after forming the silicide layer 12 may be removed by wet chemical etching. In an embodiment, the section of the semiconductor layer 14 is only partially silicided such that a thickness of the single-crystal semiconductor material of the section of the semiconductor layer 14 remains intact and non-reacted beneath an interface with the silicide layer 12. The silicidation reaction can be limited by, for example, limiting the thickness of the deposited layer of silicide-forming metal that is available to react with the semiconductor material of the section of the semiconductor layer 14. The silicidation process is self-aligned because the silicide-forming metal does not react with the dielectric material of the buried insulator layer 16.

The section of the semiconductor layer 14, which is thinned by the formation of the silicide layer 12, may have an outer boundary 30 that extends about its perimeter (i.e., outer side surface). The silicide layer 12, which may be formed by a self-aligned process, may also share the outer boundary 30. The silicide layer 12 may be in direct contact with the section of the semiconductor layer 14 along the interface and over the entire surface area of the interface. The silicide layer 12 may have a uniform or substantially uniform thickness across the entire interface with the section of the semiconductor layer 14. The surface of the buried insulator layer 16 surrounding the silicide layer 12 and the section of the semiconductor layer 14 may be exposed following silicidation.

Figure 3:
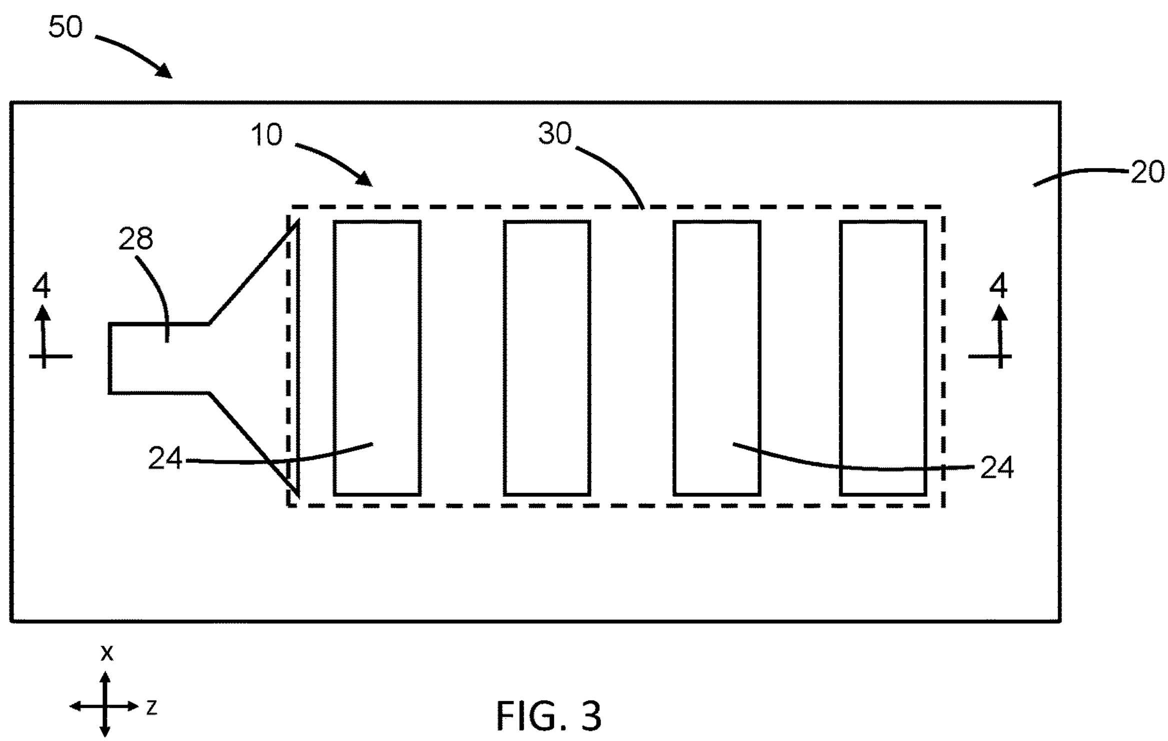
FIG. 3 is a top view of the structure at a fabrication stage subsequent to FIGS. 1, 2.
Figure 4:
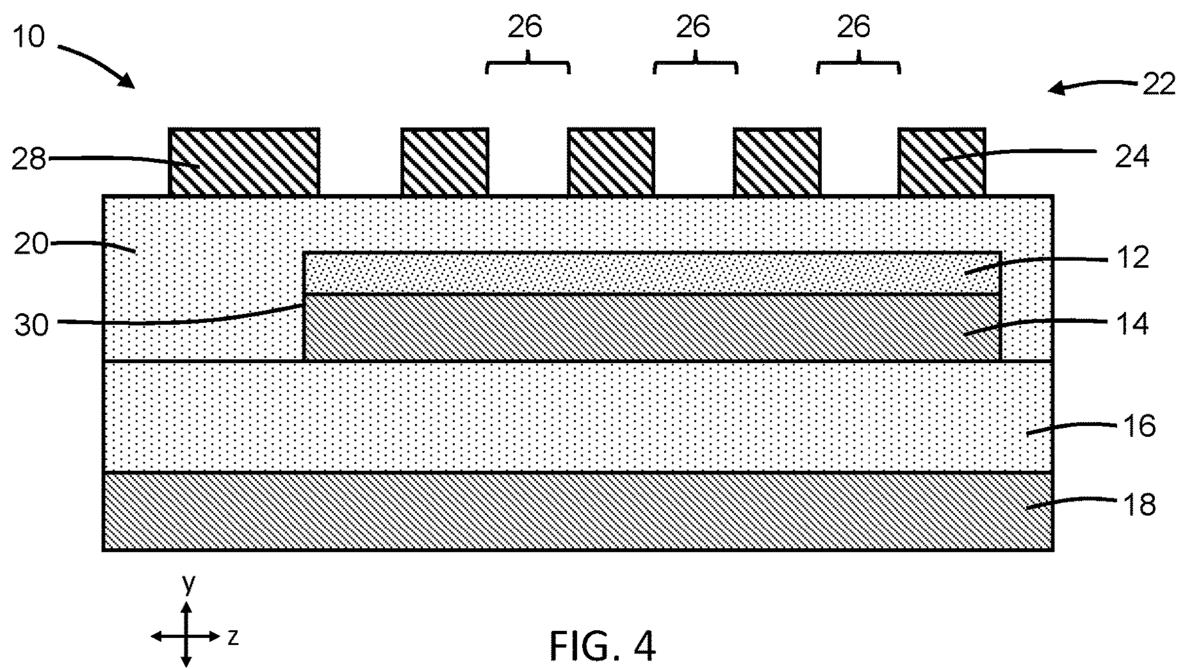
FIG. 4 is a cross-sectional view of the structure taken generally along line 4-4 in FIG. 3.

With reference to FIGS. 3, 4 in which like reference numerals refer to like features in FIGS. 1, 2 and at a subsequent fabrication stage, a dielectric layer 20 is formed over the silicide layer 12, the section of the semiconductor layer 14 underlying the silicide layer 12, and the buried insulator layer 16 surrounding the section of the semiconductor layer 14 and the silicide layer 12. The dielectric layer 20 may be composed of a dielectric material, such as silicon dioxide, formed by chemical vapor deposition or atomic layer deposition and planarized with chemical-mechanical polishing. A portion of the dielectric layer 20 may directly contact the silicide layer 12, and the silicide layer 12 and the section of the semiconductor layer 14 may be partially embedded inside the dielectric layer 20.

Figure 3A:
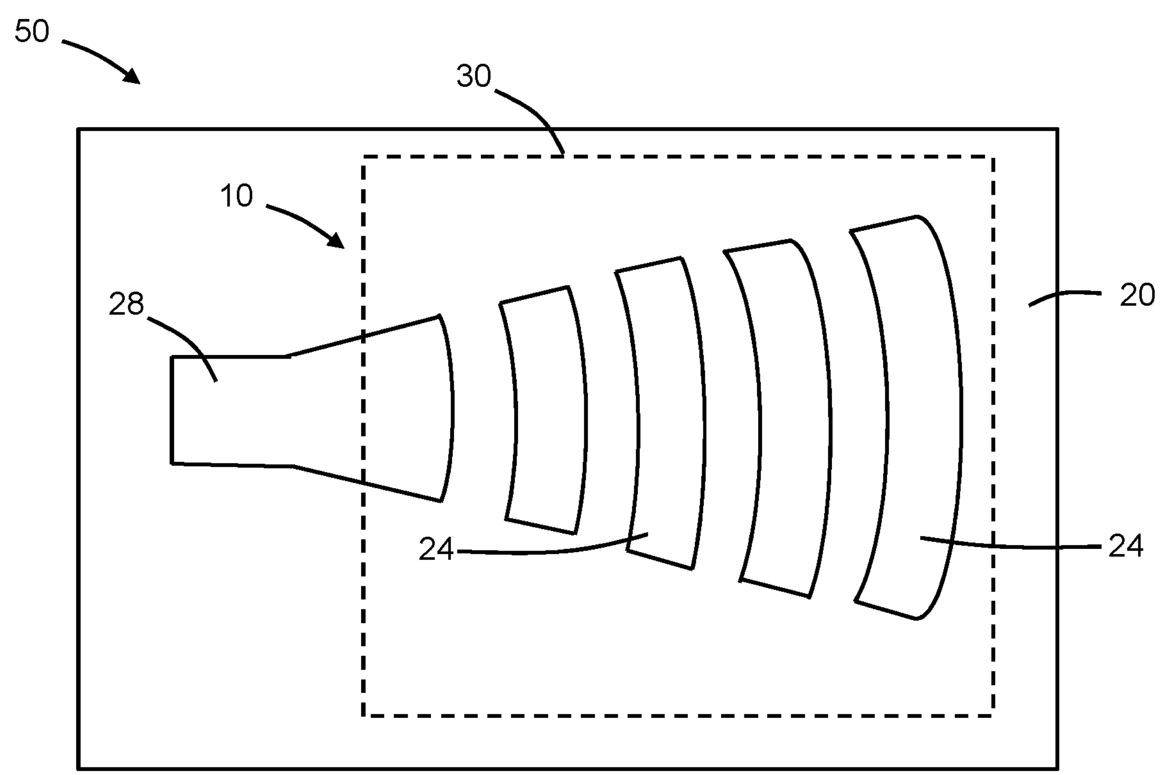
FIGS. 3A, 3B are top views of structures in accordance with alternative embodiments of the invention.
Figure 3B:
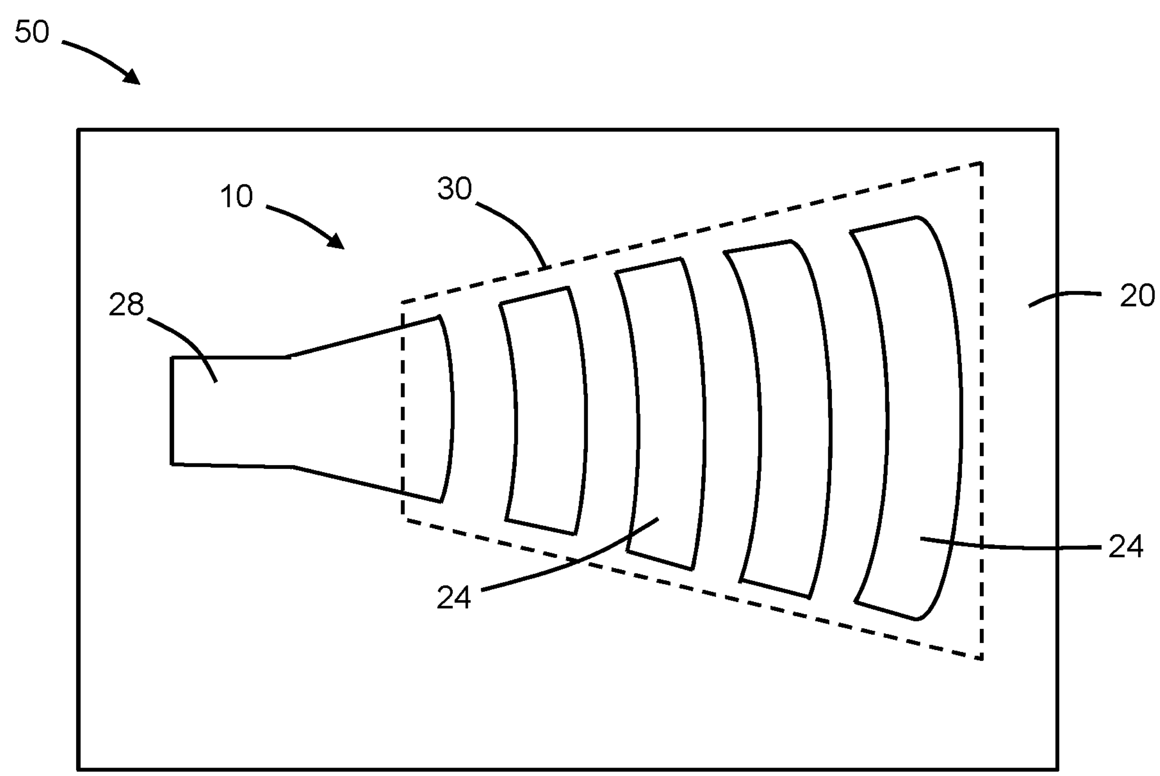

The structure 10 further includes a grating coupler 22 and a waveguide 28 that are positioned on the dielectric layer 20 with the grating coupler 22 coupled to the waveguide 28. The grating coupler includes an arrangement of grating structures 24 and grooves 26 in which the grooves 26 alternate with the grating structures 24. The grooves 26 are trenches that may extend to the dielectric layer 20 to define respective spaces or gaps arranged between adjacent pairs of the grating structures 24. In an embodiment, the grating structures 24 may be arranged as a group of spaced-apart parallel line shapes having a given set of dimensions (e.g., width and length) and pitch. In an alternative embodiment and as shown in FIGS. 3A, 3B, the grating structures 24 may be curved and arranged as a group of concentric arc shapes of different length that are nested together. For example, the length of the curved grating structures 24 may progressively increase with increasing distance from the waveguide 28. In an alternative embodiment, the arrangement of the grating structures 24 of the grating coupler 22 may be apodized (i.e., aperiodic) with a pitch that varies as a function of position.

The grating structures 24 are positioned over the silicide layer 12 and the section of the semiconductor layer 14 with the dielectric layer 20 intervening between the silicide layer 12 and the section of the semiconductor layer 14. In an embodiment, the grating structures 24 are positioned directly over the silicide layer 12 and the section of the semiconductor layer 14 with the dielectric layer 20 intervening between the silicide layer 12 and the section of the semiconductor layer 14. In an embodiment, the grating structures 24 are positioned directly over the silicide layer 12 and the section of the semiconductor layer 14 with the dielectric layer 20 intervening between the silicide layer 12 and the section of the semiconductor layer 14, and the grating structures 24 are centered relative to the outer boundary 30.

In an embodiment and as shown in FIG. 3, the grating structures 24 may be positioned inside or interior of the outer boundary 30 of the silicide layer 12 and the section of the semiconductor layer 14. However, other dimensional relationships are contemplated. For example, the grating structures 24 may extend outside of the outer boundary 30 of the silicide layer 12 and the section of the semiconductor layer 14. For example, the opposite ends of the grating structures 24 may coincide in position with the outer boundary 30 of the silicide layer 12 and the section of the semiconductor layer 14. In an embodiment and as shown in FIG. 3, the outer boundary 30 of the silicide layer 12 and the section of the semiconductor layer 14 is rectangular. However, other shapes are contemplated. For example and as shown in FIG. 3B, the outer boundary 30 may be non-rectangular (e.g., trapezoidal), which may match the tapered shape of grating structures 24 arranged as concentric arc shapes of different length. In particular, the width of the silicide layer 12 may also progressively increase with increasing distance from the waveguide 28 similar to the progressive increase in the length of the curved grating structures 24. The shapes of the outer boundary 30 and the arrangement of grating structures 24 may match, or the respective shapes may differ.

The grating structures 24 and the waveguide 28 may be formed by depositing a uniform layer of a given material on the dielectric layer 20 and patterning the deposited layer with lithography and etching processes. To that end, an etch mask is formed by a lithography process over the deposited layer, and the deposited layer is etched with an etching process, such as reactive ion etching. The etching process may be selected to stop on the material of the dielectric layer 20 after penetrating fully through the deposited dielectric layer. In an embodiment, the grating structures 24 and the waveguide 28 may be composed of a dielectric material, such as silicon nitride, that is deposited by chemical vapor deposition. The deposited layer may be annealed prior to patterning to reduce its hydrogen content. In an alternative embodiment, the grooves 26 may only penetrate partially through the deposited layer such that the grating structures 24 are connected at their base by a thin layer of their constituent dielectric material. Due at least in part to their concurrent formation, the grating structures 24 and the waveguide 28 may be coplanar or substantially coplanar with coplanar top and bottom surfaces. The waveguide 28 may include a taper to provide a width-matching transition with the grating structures 24, and a portion of the taper may be located interior of the outer boundary 30.

In the representative embodiment, the grating structures 24 are depicted as rectangular shapes having vertical sidewalls. However, in alternative embodiments, the grating structures 24 may be trapezoidal with sidewalls tapering from top to bottom, trapezoidal with sidewalls having inverse tapering (i.e., flaring) from top to bottom, or non-rectangular (e.g., rounded). Because of the alternating relationship developed during patterning, the grooves 26 have an inverse or complementary shape that conforms to the shape of the grating structures 24.

Figure 5:
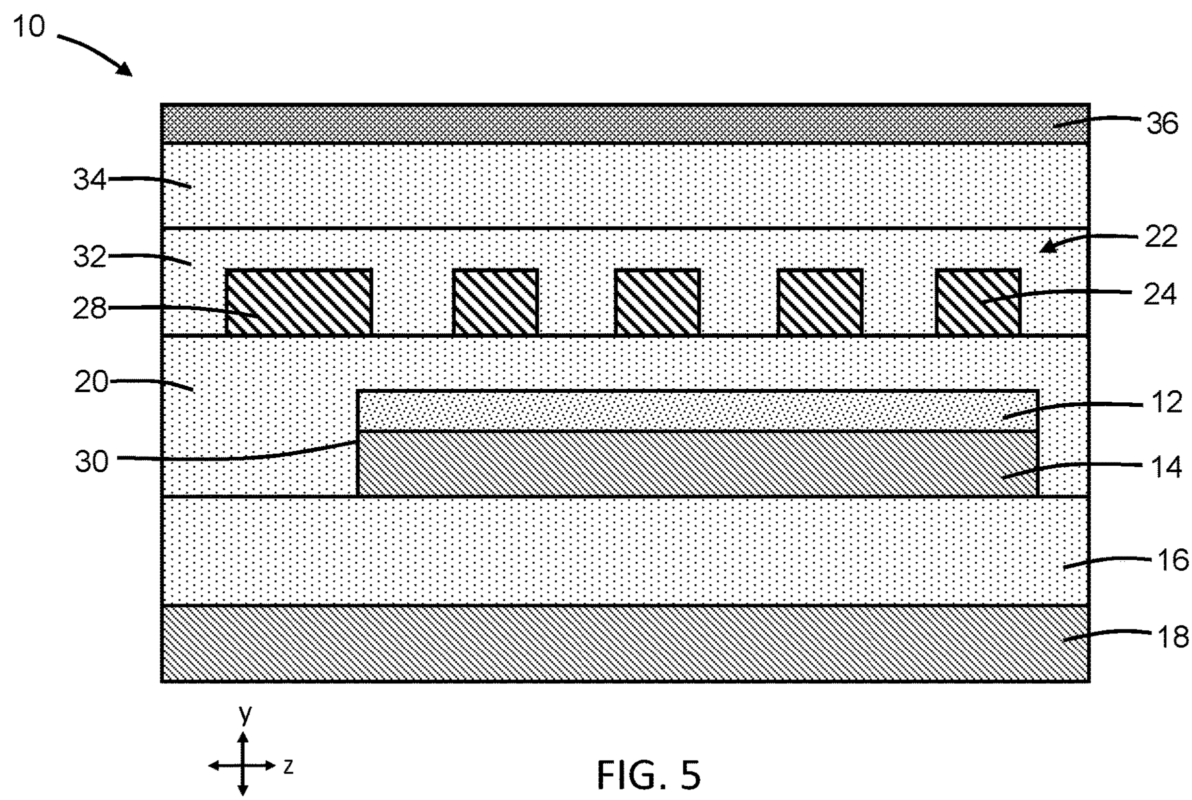
FIG. 5 is a cross-sectional view of the structure at a fabrication stage subsequent to FIGS. 3, 4.

With reference to FIG. 5 in which like reference numerals refer to like features in FIG. 4 and at a subsequent fabrication stage, a dielectric layer 32 is deposited by, for example, atomic layer deposition over the grating structures 24, waveguide 28, and dielectric layer 20, and then planarized by chemical-mechanical polishing. The dielectric layer 32 may be composed of a dielectric material (e.g., silicon dioxide), and the polishing may remove topography produced in the dielectric layer 32 by the underlying grating structures 24. For example, the dielectric layer 32 may be composed of silicon dioxide deposited by chemical vapor deposition using ozone and tetraethylorthosilicate (TEOS) as reactants. Portions of the dielectric layer 32 occupy, and may fully fill, the grooves 26 (FIG. 4) between adjacent pairs of the grating structures 24. In an embodiment, the dielectric layer 32 may be thicker than the grating structures 24 and the waveguide 28.

A back-end-of-line stack 34 is formed by back-end-of-line (BEOL) processing over the dielectric layer 32. The back-end-of-line stack 34 may include one or more interlayer dielectric layers composed of one or more dielectric materials, such as carbon-doped silicon oxide, and metallization composed of, for example, copper, aluminum, tungsten, and/or cobalt that is arranged in the one or more interlayer dielectric layers. An optional cladding layer 36 composed of a dielectric material, such as silicon nitride, may be deposited over the back-end-of-line stack 34. The back-end-of-line stack 34 may be free of metallization over the grating coupler 22 and silicide layer 12.

The structure 10, in any of its embodiments described herein, may be integrated into a photonics chip 50 (FIG. 1) that includes electronic components and additional optical components. For example, the electronic components may include field-effect transistors that are fabricated by CMOS front-end-of-line (FEOL) processing.

The silicide layer 12 and the section of the semiconductor layer 14 may function as a bilayer mirror in the construction of the structure 10. The bilayers of the mirror include the silicide layer 12, which contains a metal and a semiconductor material, and the section of the semiconductor layer 14, which contains only the semiconductor material. The silicide layer 12 does not require a complex process for its formation, in contrast to mirrors constructed using a single layer of a pure metal (i.e., a metal containing atoms of only one type of metallic element). Instead, a self-aligned silicidation process may be used to form the silicide layer 12 on a previously-patterned section of the semiconductor layer 14. The bilayer mirror is monolithically integrated into the photonics chip 50 with the grating coupler 22.

Figure 6:
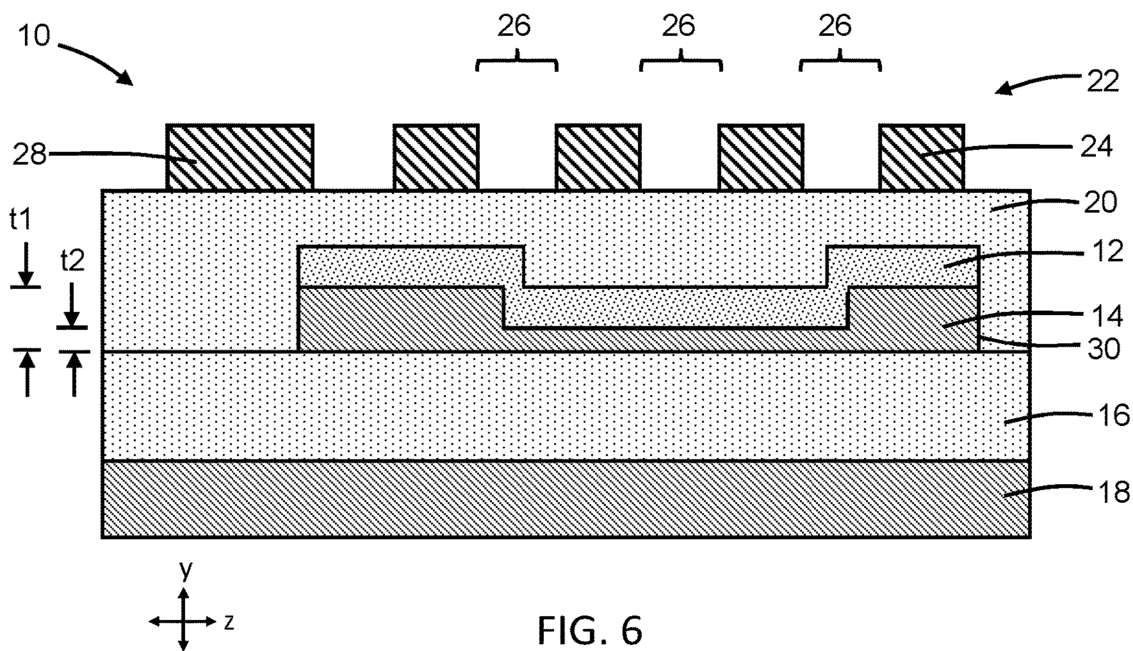
FIG. 6 is a cross-sectional view of a structure in accordance with alternative embodiments of the invention.

With reference to FIG. 6 in which like reference numerals refer to like features in FIG. 5 and in accordance with alternative embodiments of the invention, the section of the semiconductor layer 14 may include multiple thicknesses of single-crystal semiconductor material (e.g., single-crystal silicon). In an embodiment, the section of the semiconductor layer 14 may include portions having a thickness, t1, and a portion having a thickness, t2, which is less than the thickness, t1, laterally positioned between the portions of thickness, t1. The thickness, t1, may be equal to or substantially equal to the original thickness of the device layer of the SOI wafer. The thickness, t1, may be equal to an etched thickness that is less than the original thickness of the device layer of the SOI wafer. The silicide layer 12, which is formed over the multiple-thickness section of the semiconductor layer 14 as previously described, adopts the uneven topography of the section of the semiconductor layer 14 but may have a uniform thickness.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:

a semiconductor substrate;

a first dielectric layer on the semiconductor substrate;

a semiconductor layer including a section on the first dielectric layer, the semiconductor layer comprised of a single-crystal semiconductor material;

a silicide layer on the section of the semiconductor layer, the silicide layer in direct contact with the section of the semiconductor layer along an interface;

a second dielectric layer over the section of the semiconductor layer and the silicide layer, the second dielectric layer including a portion in contact with the silicide layer;

a grating coupler including a plurality of grating structures positioned on the second dielectric layer over the silicide layer and the section of the semiconductor layer; and a waveguide positioned on the second dielectric layer, the waveguide coupled with the grating coupler.

2. The structure of claim 1 wherein the silicide layer is positioned between the grating coupler and the section of the semiconductor layer.

3. The structure of claim 1 wherein the section of the semiconductor layer includes a first portion having a first thickness and a second portion having a second thickness, and the silicide layer is disposed on the first portion of the section of the semiconductor layer and on the second portion of the section of the semiconductor layer.

4. The structure of claim 1 wherein the plurality of grating structures are comprised of silicon nitride.

5. The structure of claim 1 wherein the silicide layer and the section of the semiconductor layer provide a bilayer mirror.

6. The structure of claim 1 wherein the section of the semiconductor layer comprises a section of a device layer of a silicon-on-insulator wafer.

7. The structure of claim 1 wherein the silicide layer is positioned between the grating coupler and the section of the semiconductor layer, and the plurality of grating structures are positioned directly over the silicide layer.

8. The structure of claim 1 wherein the section of the semiconductor layer and the silicide layer have an outer boundary that is shared, and the plurality of grating structures are positioned inside the outer boundary.

9. The structure of claim 1 further comprising:

a back-end-of-line stack over the grating coupler; and a third dielectric layer positioned over the back-end-of-line stack, the third dielectric layer comprised of silicon nitride.

10. The structure of claim 1 wherein the waveguide and the plurality of grating structures are coplanar.

11. The structure of claim 1 wherein the grating coupler includes a plurality of grooves that alternate with the plurality of grating structures, and the second dielectric layer includes portions that fill the plurality of grooves.

12. A method comprising:

patterning a semiconductor layer to form a section on a first dielectric layer that is positioned on a semiconductor substrate;

forming a silicide layer on the section of the semiconductor layer;

forming a second dielectric layer over the section of the semiconductor layer and the silicide layer;

forming a grating coupler including a plurality of grating structures positioned on the second dielectric layer over the silicide layer and the section of the semiconductor layer; and forming a waveguide positioned on the second dielectric layer, wherein the first dielectric layer includes a portion in contact with the silicide layer, the waveguide is coupled with the grating coupler, the semiconductor layer is comprised of a single-crystal semiconductor material, and the silicide layer is in direct contact with the section of the semiconductor layer along an interface.

13. The method of claim 12 wherein the silicide layer is positioned between the grating coupler and the section of the semiconductor layer.

14. The method of claim 12 wherein forming the grating coupler comprises:

depositing a third dielectric layer; and patterning the third dielectric layer to form the plurality of grating structures directly over the silicide layer.

15. The method of claim 12 wherein the section of the semiconductor layer and the silicide layer have an outer boundary, and the plurality of grating structures are positioned inside the outer boundary.

16. The method of claim 12 wherein the section of the semiconductor layer includes a first portion having a first thickness and a second portion having a second thickness, and the silicide layer is disposed on the first portion of the section of the semiconductor layer and on the second portion of the section of the semiconductor layer.

17. The structure of claim 1 wherein the plurality of grating structures have a tapered arrangement as concentric arc shapes of different length, and the silicide layer is trapezoidal.

18. The structure of claim 17 wherein the silicide layer widens with increasing distance from the waveguide, and the plurality of grating structures lengthen with increasing distance from the waveguide.

* * * * *